United States Patent [19]

Clapper et al.

[11] Patent Number: 4,497,147
[45] Date of Patent: Feb. 5, 1985

[54] DRIPS-CATCHING MATS FOR GARAGE FLOORS AND THE LIKE

[76] Inventors: David D. Clapper, 1306 Peterson Dr., Omaha, Nebr. 68130; Thomas E. Talmadge, 4803 N. 80th Ave., Omaha, Nebr. 68134

[21] Appl. No.: 425,725

[22] Filed: Sep. 28, 1982

Related U.S. Application Data

[63] Continuation-in-part of Ser. No. 219,445, Dec. 23, 1980, abandoned.

[51] Int. Cl.³ .......................... B32B 7/00; E04H 6/42
[52] U.S. Cl. .................................. 52/105; 52/173 R; 15/215; 210/924; 296/38
[58] Field of Search .................. 15/238, 215, 216; 52/98, 105, 173, 177; 404/35; 34/89.1, 89.2; 296/38; 141/364; 210/924, 242.4

[56] References Cited

U.S. PATENT DOCUMENTS

| | | | |
|---|---|---|---|
| 2,843,868 | 7/1958 | Borgstrom | 15/215 |
| 3,083,393 | 4/1963 | Nappi | 15/215 |
| 3,517,407 | 6/1970 | Wyant | 15/238 |
| 3,785,102 | 1/1974 | Amos | 15/215 |
| 3,817,015 | 6/1974 | Frangos | 52/511 |
| 4,107,811 | 8/1978 | Imsande | 15/215 |
| 4,143,194 | 3/1979 | Wihkswe | 15/215 |

Primary Examiner—John E. Murtagh
Attorney, Agent, or Firm—George R. Nimmer

[57] ABSTRACT

Drips-catching mats for installation in combination with a minor proportion of a floor especially a garage floor beneath a motor vehicle to capture oil drippings therefrom. The mat essentially comprises generally horizontally extending laminar elements including: a base member highly-tenaciously bonded to the underlying floor environment; an oleophilic blotter member having a lower-tenacity attached to the base member whereby an oleo-laden blotter can be manually replaced with a fresh blotter without disrupting the high-tenacity flooring bond to the base member, the lower-tenacity attachment preferably comprising an oleo-resistant laminar adhesive; and visual indicator means to indicate when blotter replacement is necessary.

3 Claims, 7 Drawing Figures

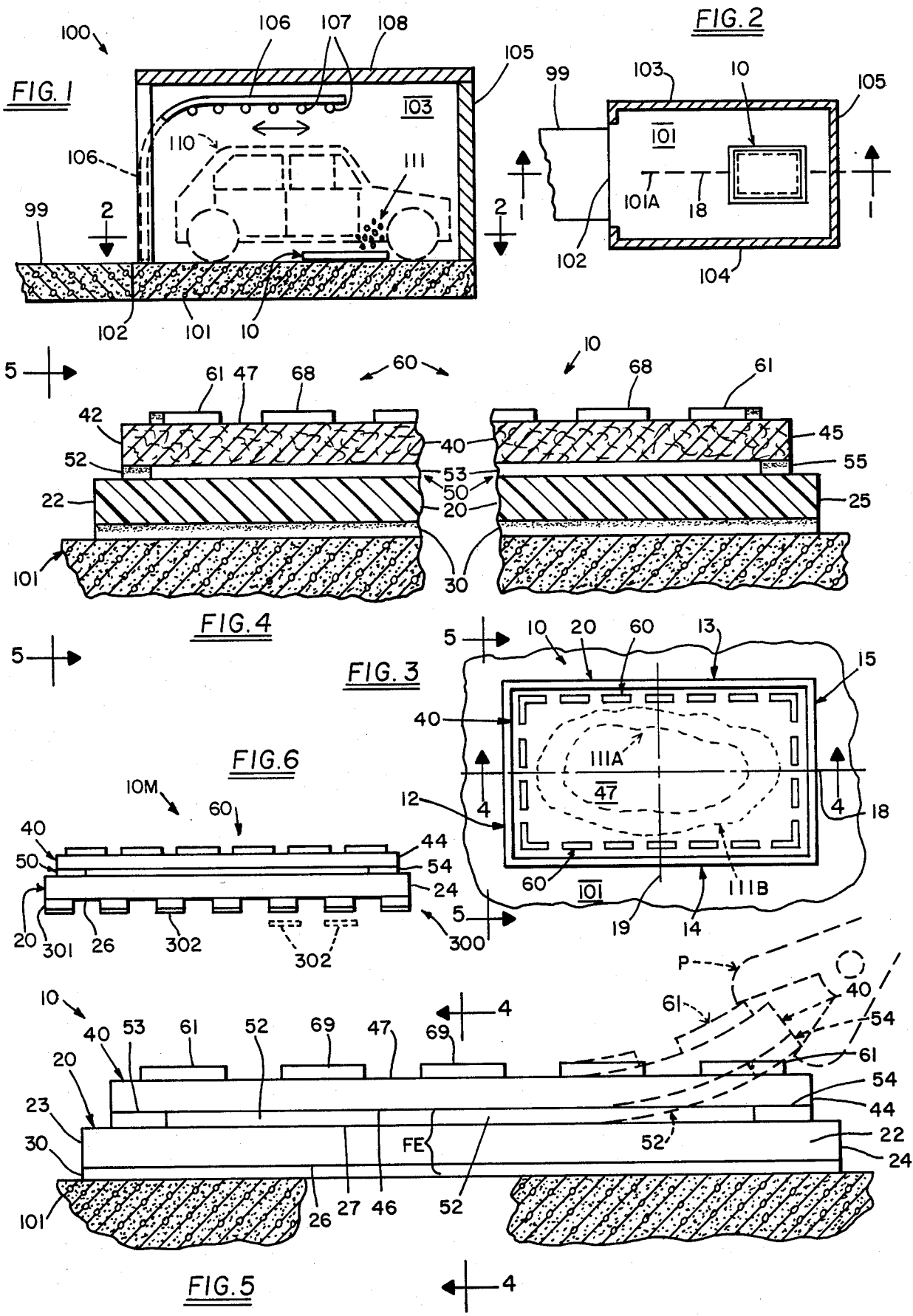

DRIPS-CATCHING MATS FOR GARAGE FLOORS AND THE LIKE

This is a continuation-in-part of co-pending application Ser. No. 219,445, filed Dec. 23, 1980, now abandoned.

Owners of motor vehicle garages are invariably confronted with the problem of oil drippings from the automobile lubrication and hydraulic parts. Thus, garage owners have to periodically perform the laborious and disagreeable task of cleansing the garage floor. Attempts to protect the garage floor with laminar sheeting materials are plagued with the necessity of having to replace the sheeting periodically, which should be easily performed and before the sheeting has become oleaginously super-saturated.

It is accordingly the general object of the present invention to provide drips-catching mats adapted for easy and releasable and reliable installation onto a minor proportion of the garage floor beneath the vehicle, and which can be easily and economically replaced at the opportune time, before becoming oleaginously super-saturated.

With the above and other objects and advantages in view, which will become more apparent as this description proceeds, the drips-catching mat has a mat-perimeter remotely surroundable by the floor-perimeter and generally comprises the following horizontally extending elements: a base member including an upper-surface and a lower-surface and being semi-permanently bonded to the garage floor with a high-tenacity means located below said lower-surface; an oleophilic blotter member having an upper-face and a lower-face and being removably attached to the base member with a lower-tenacity means, said lower-tenacity means being markedly lower in physical strength than the high-tenacity means whereby an upward manual force applied to the blotter will delaminate the blotter from the base member without accompanying delamination of the base member from the garage floor; and visual indicator means attached to the blotter to indicate whenever it has become laden with oleaginous drippings and needs to be replaced with a fresh blotter.

In the drawing, wherein like characters refer to like parts in the several views, and in which:

FIG. 1 is a longitudinally extending sectional elevational view taken along line 1—1 of FIG. 2 showing a typical motor vehicle garage with which the drip-catchings mats of the present invention might be employed;

FIG. 2 is a sectional plan view taken along line 2—2 of FIG. 1;

FIG. 3 is a detailed view of FIG. 2 showing a solitary drips-catching mat installed upon a minor proportion of the garage floor;

FIG. 4 is a fragmented longitudinally extending sectional elevational view taken along line 4—4 of FIG. 3;

FIGS. 5 and 5c are a transversely extending elevational view taken along line 5—5 of FIG. 3; and FIG. 6 is a transversely extending elevational view similar to FIG. 5 showing an alternate embodiment drips-catching mat in condition ready for adherent installation onto the garage floor.

Figure 5C:
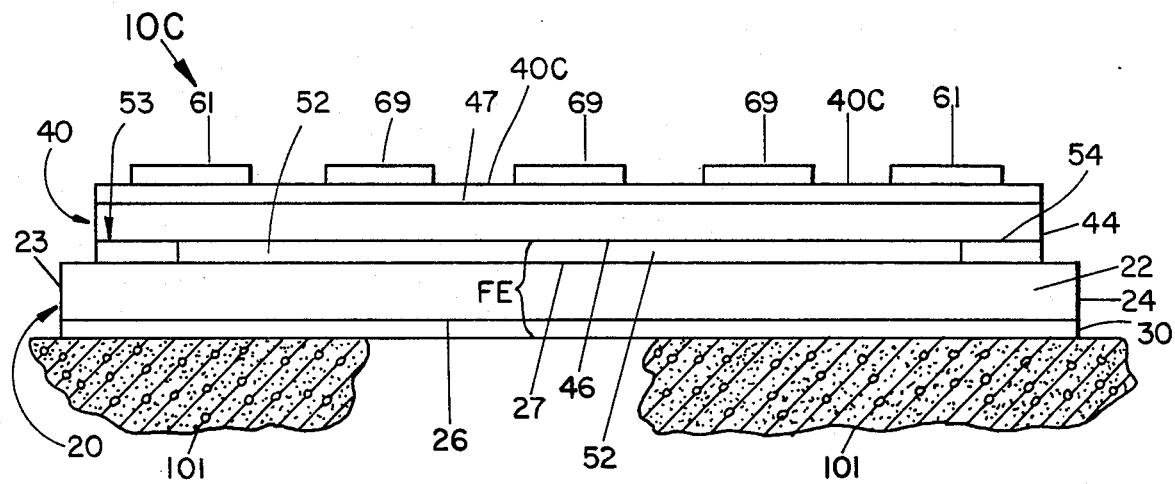

As alluded to in FIGS. 1 and 2, typical motor vehicle garage 100 comprises a substantially horizontal floor 101 extending longitudinally along floor-axis 101A. Floor 101 has a finite floor-area such as defined by a rectangular floor-perimeter 102–105. As seen in FIG. 2, the longitudinally extending perimeter edges 103 and 104 might be at upright parallel garage walls, the transversely extending perimeter edge 105 might be at upright garage wall 105, and the transversely perimeter edge 102 might be the juncture between driveway 99 and floor 101. Typical garage 100 includes a door 106 supported upon rollers 107 whereby, as indicated in phantom line 106, to provide a closure at transverse juncture 102. In FIG. 1, the double-headed arrow indicates that motor vehicle 110 is longitudinally movable, and circlets 111 indicate oleaginous material drippings from automobile 110 parked upon floor 101 and predominately emanating from the engine portion. Representative mat 10 is adapted to capture the drippings 111 and is installed atop a minor proportion of the floor-area whereby the mat-perimeter 12–15 is remotely surrounded by floor-perimeter 102–105. In this vein, as best indicated in FIG. 2, the floor-area bears a many-fold ratio as compared to the mat-area of a solitarily employed mat 10, 10M. Thus, a wide expanse of exposed naked flooring 101, which is commonly of concrete structural material, surrounds the mat perimeter 12–15.

As seen in FIGS. 3–5, representative mat embodiment 10 essentially comprises three main horizontal laminar elements including: a base member 20 semi-permanently bonded (e.g. 30) to flooring 101, a blotter member 40 above base member 20 and in manually detachable relationship therewith as by elevated adhesive means 50 interposed between layers 20 and 40, and visual indicator means (e.g. 60) at the blotter member upper-face 47 to indicate when the oil-laden blotter member needs to be replaced with a fresh blotter.

The base member layer (e.g. 20) has a finite base-area not exceeding that mat overall-area and defined by a base-perimeter 22–25, and the base member has a pair of opposed broad horizontal surfaces including an upper-surface 27 and a lower-surface 26. The base member is lengthier along mat longitudinal-axis 18 than along mat transverse-axis 19 and is desireably of rectangular shape. Preferably, the base member is oleo-resistant, and for reasons to be explained later in greater detail, resinous structural materials are desireable. For example, a $24'' \times 36''$ rectangular piece of 0.30 inches thick acrylon nitrobutadene styrene sheeting and providing the mat overall-area is adequate for the purposes of the present invention. The base member is semi-permanently bonded to the garage floor 101 with high-tenacity means located below its lower-surface 26, such as underlying laminar adhesive means (e.g. 30) attached to lower-surface 26 and to floor 101 whereby lower-surface 26 is elevated above the flooring.

The blotter member layer (e.g. 40) has a finite blotter-area not exceeding the mat overall-area and defined by the blotter-perimeter 42–45, and the blotter member has a pair of opposed broad horizontal faces including an upper-face 47 and a lower-face 46. The blotter perimeter (e.g. 42–45) is preferably surrounded by the base perimeter (e.g. 22–25) whereby the latter defines the mat-perimeter (e.g. 12–15). The blotter member is lengthier along mat longitudinal-axis 18 than along mat transverse-axis 19 and is desireably of rectangular shape. Oleophilic structural materials for the blotter member are preferred, such as cellulosic sheeting. For example, a $22\frac{1}{2}'' \times 34\frac{1}{2}''$ rectangular piece of 0.26 inch thick "10 point printers' chipboard" is suitable for the purposes herein, in conjunction with said $24'' \times 36''$ piece of 0.30 inch gauge resinous sheeting.

At a finite elevation "FE" above garage floor 101, blotter member lower-face 46 overlies base member upper-surface 27 and is removably attached thereto with a lower-tenacity means e.g. 50. The lower-tenacity means is markedly lower in physical strength than is the high-tenacity means located at flooring 101. Specifically, as indicated in FIG. 5 phantom line, upward manual force (e.g. with pliers "P") applied to an isolated location of the blotter-periphery 42–45 will delaminate the blotter member from the base member without accompanying delamination of the base member from the garage floor 101; this permits easy replacement of the blotter member with a like member carrying therewith at least a portion of the lower-tenacity means. Because of the possibility of oil 111 filtering from face 47 to face 46, mechanical fasteners as the lower-tenacity means have less desireability since they tend to inimicably provide the base member with oil-conducting perforations. Thus, "laminarly extending oleo-resistant adhesive means", actuatably extending between base upper-surface 27 and blotter lower-face 46, are preferred for the lower-tenacity means. The term "laminarly extending oleo-resistant adhesive means" includes both non-mechanical pressure-sensitive chemicals and mechanical adhesives, and for the latter preferably the hooks-and-eyes "Velcro" type described in U.S. Pat. No. 3,009,235. Non-mechanical pressure-sensitive chemical type adhesives may be empirically selected by testably applying same upon the base member upper-surface 27 having a fine film of motor oil thereon. For example, such empirical testing reveals that one currently marketed under the trade name "ARNO-C708" is admirably suited for the lower-tenacity "laminarly extending oleo-resistant adhesive means" of the non-mechanical pressure-sensitive chemical type.

Many such pressure-sensitive chemical type adhesives, including said ARNO-C708", are alternatively commercially available in tape-like band form whereby they might be utilized as narrow linear bands 52–55 extending along the respective linear peripheral segments 42–45 of the blotter-periphery. Moreover, such tape-like bands, including "ARNO-C708", will function well as the underlying high-tenacity means e.g. 30, 300, if the aggregate linear length of the higher elevation lower-tenacity means is less than one-half the aggregate linear length of the lower elevation high-tenacity means. In the latter vein, and as indicated in FIG. 6, the underlying pressure-sensitive adhesive band lengths (e.g. 300) might be provided in the readily available commercial form having releasably adhered pre-installation protective coating layer 302 for the actual pressure-sensitive adhesive 301.

There are annularly extending visual indicator means e.g. 60, attached to the blotter member upper-face to indicate whenever the blotter member has become substantially fully laden with oleaginous drippings 111 and heeds replacement with a substitute blotter member. In order to mitigate against oleaginous fouling of the lower-tenacity means laminarly extending along the blotter-perimeter (e.g. 42–45), said visual indicator means is preferably surrounded by the blotter-perimeter and by the lower-tenacity means therealong. For example, the visual indicator means might comprise painted striping (61, 68, 69) raisably extending above the blotter upper-face 47. In FIGS. 4 and 5, and 5C, 68 refers to indicator striping rows parallel to longitudinal-axis 18 and edges 43 and 44; 69 refers to indicator striping rows parallel to transverse-axis 19 and edges 42 and 45; and 61 refers to cornered junctures between striping rows 68 and 69. 111A and 111B in FIG. 3 indicates progressive movement of the oil stain (111) along blotter member (e.g. 40) toward perimeter 42–45 and the intervening indicator means (e.g. 60).

Drips-catching mat embodiment 10C shown in FIG. 5C differs from embodiment 10 shown in related FIG. 5 only in that the blotter member layer comprises two coextensive solid strata including a thicker lower-stratum 40 consisting of said porous cellulosic material and a thinner oleaginous upper-stratum 40C topically adhered to lower-stratum 40. With such dual-strata construction, the oleaginous upper-stratum 40C causes horizontal spreading of the oleaginous liquid drippings (e.g. 111) which decreases the time required for such drippings to become fully absorbed by the porous cellulosic lower-stratum 40. As ancillary results of having oleaginous upper-stratum 40C, the drips-catching mat (e.g. 10C) is maintained in non-slippery topical condition and in a relatively aesthetically clean appearance until such time as the porous cellulosic lower-stratum becomes fully laden with liquid drippings whereupon the entire blotter member will be replaced. Presently preferred for the oleaginous upper-stratum is a homogeneous mixture of substantially 100 parts by weight paraffin and 20 parts by weight linseed oil coated with volatile solvent such as naptha (drying to non-tacky condition).

From the foregoing, the construction and operation of the drips-catching mats will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

What is claimed is as follows:

1. In combination with a motor vehicle garage having a substantially horizontal floor of a finite floor-area defined by a floor-perimeter, the improvement of a drips-catching mat for capturing oleaginous material dripping from a motor vehicle parked upon said garage floor in overlying relationship to said mat, said mat having a finite overall-area defined by a mat-perimeter remotely surrounded by the floor-perimeter, said drips-catching mat comprising the following generally horizontally extending laminar elements:

A. an oleo-resistant and generally non-perforated base member layer having a finite base-area not exceeding said overall-area and defined by a base perimeter, said base member having a pair of opposed broad horizontal surfaces including an upper-surface and a lower-surface, said base member being semi-permanently bonded to the garage floor with high-tenacity means located below said lower-surface;

B. a blotter member layer having a finite blotter-area not exceeding said overall-area and defined by a blotter-perimeter, said blotter member layer comprising two coextensive solid horizontal strata including a thicker lower-stratum comprising porous cellulosic structural material and a thinner oleaginous upper-stratum adhered to the lower-stratum whereby said upper-stratum causes horizontal spreading of oleaginous liquid drippings and thereby decreases the time for such drippings to become fully absorbed by the porous cellulosic lower-stratum, said blotter member lower-stratum being above the base member upper-surface and a finite-elevation above the garage floor and being removably attached to the base member with a lower-tenacity means, said lower-tenacity means being markedly lower in physical strength than the high-tenacity means whereby an upward manual force applied to the blotter-periphery will delaminate the blotter member from the base member without accompanying delamination of the base member from the garage floor; and C. visual indicator means attached to the blotter member upper-stratum to indicate whenever the blotter member has become substantially fully laden with oleaginous drippings and needs replacement with a substitute blotter member.

2. The combination of claim 1 wherein the upper-stratum comprises a homogeneous mixture of substantially 100 parts by weight paraffin and 20 parts by weight linseed oil; and wherein the blotter-perimeter is surrounded by the base-perimeter and the base-perimeter also defines the mat-perimeter.

3. A drips-catching mat for installing onto a minor proportion of horizontal flooring so as to capture liquid oleaginous material dripping from machinery parked upon the flooring, said drips-catching mat comprising the following generally horizontally extending laminar elements:

A. an oleo-resistant and generally non-perforated base member layer having a base-perimeter and a pair of opposed broad horizontal surfaces including an upper-surface and a lower-surface;

B. a blotter member layer having a blotter-perimeter surrounded by the base-perimeter and comprising two coextensive solid horizontal strata including a thicker lower-stratum comprising porous cellulosic structural material and a thinner oleaginous upper-stratum adhered to the lower-stratum, said upper-stratum comprising a homogeneous mixture of substantially 100 parts by weight paraffin and 20 parts by weight linseed oil whereby said upper-stratum causes profound horizontal spreading of oleaginous liquid drippings and thereby markedly decreases the time for such drippings to become fully absorbed by the porous cellulosic lower-stratum, said blotter member lower-stratum being removably attached to the base member with a relatively low tenacity means whereby an upward manual force applied to the blotter-periphery will readily delaminate the blotter member from the base member to permit ready replacement of the blotter member; and C. annular visual indicator means at the blotter member upper-stratum and surrounded by the base-perimeter to indicate whenever the blottter member has become substantially fully laden with oleaginous drippings from the parked machinery.

* * * * *